(12) United States Patent
Janmaat et al.

(10) Patent No.: US 7,947,760 B2
(45) Date of Patent: May 24, 2011

(54) EMULSION COMPOSITIONS FOR USE IN PRINTING INKS

(75) Inventors: Rein J. Janmaat, Amstelveen (NL); James W. Taylor, Gurnee, IL (US); Mark van den Brink, Heerenveen (NL); Andre van Meer, Noordwolde (NL)

(73) Assignee: BASF Corporation, Florham Park, NJ (US)

( * ) Notice: Subject to any disclaimer, the term of this patent is extended or adjusted under 35 U.S.C. 154(b) by 955 days.

(21) Appl. No.: 11/230,114

(22) Filed: Sep. 19, 2005

(65) Prior Publication Data

US 2006/0063868 A1    Mar. 23, 2006

(51) Int. Cl.
| | |
|---|---|
| B05D 7/00 | (2006.01) |
| C08F 20/08 | (2006.01) |
| C08F 20/66 | (2006.01) |
| C08F 22/04 | (2006.01) |
| C08F 120/08 | (2006.01) |
| C08F 122/04 | (2006.01) |
| C08F 220/08 | (2006.01) |
| C08F 222/04 | (2006.01) |
| C08G 18/42 | (2006.01) |
| C08J 3/00 | (2006.01) |
| C08J 3/22 | (2006.01) |
| C08K 5/00 | (2006.01) |
| C08L 33/00 | (2006.01) |
| C09B 67/00 | (2006.01) |
| C09D 5/00 | (2006.01) |
| C09D 11/00 | (2006.01) |

(52) U.S. Cl. ........ 523/160; 523/161; 524/500; 524/502; 524/515; 524/522; 524/525; 525/327.8

(58) Field of Classification Search .................. 523/160, 523/161; 524/500, 502, 515, 522, 525; 525/327.8
See application file for complete search history.

(56) References Cited

U.S. PATENT DOCUMENTS

| | | | |
|---|---|---|---|
| 4,414,370 | A | 11/1983 | Hamielec et al. |
| 4,529,787 | A | 7/1985 | Schmidt et al. |
| 4,546,160 | A | 10/1985 | Brand et al. |
| 5,539,073 | A | 7/1996 | Taylor et al. |
| 5,681,880 | A * | 10/1997 | Desor et al. .................. 524/320 |
| 6,596,805 | B1 | 7/2003 | Nigam et al. |
| 2002/0183460 | A1 | 12/2002 | Saeki et al. .................. 525/329.7 |
| 2003/0195297 | A1 | 10/2003 | Burghart et al. .................. 525/191 |
| 2006/0063868 | A1 | 3/2006 | Janmaat et al. |

FOREIGN PATENT DOCUMENTS

| | | |
|---|---|---|
| EP | 0 764 699 A2 | 9/1996 |
| EP | 0764699 A2 * | 3/1997 |
| EP | 1 158 031 A1 | 7/2001 |
| GB | 1337983 | 5/1970 |
| GB | 1373634 | 11/1974 |

OTHER PUBLICATIONS

Zirconium Compounds in Waterbased Coatings by Dr. P. J. Moles, Mar. 9, 1988, vol. 178, No. 4209.
International Search Report and Written Opinion for PCT/US2005/033543 dated Feb. 21, 2006.
Hock, Alfred L.: *Zirconium Compounds: The Industrial Importance of Their Aqueous Chemistry*. Magnesium Elektron Ltd. Chemistry and Industry, Nov. 2, 1974.
Moles, Peter J.; Mel Chemicals; *The Use of Zirconium in Surface Coatings*. Data Sheet 117776-1780) (2002.
Moles, Peter J.; MEL Chemicals: *Zirconium Based Crossliners for Water-based Coatings*.
Clearfield, Abraham: *Structural Aspects of Zirconium Chemistry*; Rev. Pure and Appl. Chem., 14, 91 (1964) pp. 91-108).
Brewis, D.M., Comyn, J. and Tegg, J.L., Department of Chemistry, De Montford University; Butler, C.H., Duncan, R.H., McAlpine, I. And Moles, P.J.; Magnesium Elektron Ltd..: *The Effect of Zirconium Compounds on the West Scrub-Resistance of Emulsion Polymer Film*. Surface Coatings International, 1993, (pp. 418-422.
Peters, A., Honen, A., Overbeek, A., Griffioen, S. and Annable, T.; NeoResins: *A New Generation of Water-Borne Ink Binders for Packaging Films and Paper (Part 1)*. Surface Coatings International Part B: Coatings Transactions, vol. 84, B3. 189-195, Jul. 2001.
Peters, A., Honen, A., Overbeek, A., Griffioen, S. and Annable, T.: *A New Generation of Water-Borne Ink Binders for Packaging Films and Paper (Part II)*. Surface Coatings International Part B: Coatings Transactions, vol. 84, B4., Nov. 2001.
Ricardo, Nagila, Ricardo, Nadja; Holmes, Robert, Price, Colin; *Synthesis and Characterization of Zirconium Ionomer Dispersions*. Polymer Engineering and Science, Mar. 1999, vol. 39, No. 3 (pp. 543-548).
Gilbert, Robert G.; Colloid Science: *Emulsion Polymerization, A Mechanistic Approach*. Chapter 1, pp. 1-23, Dated 1995 according to Google.
Arshady, R., Guyot, A., Lin, J., Priddy, D.B., Rusanov, A.L., Sherrington, D.C., Tauer, K.: Polymer Synthesis. *Reactive Surfactants in Emulsion Polymerization*, Mar. 1993, pp. 43-65.
De Krom, Anton; Mulder, Henk; Mestach, Dirk: *New Developments in Waterborne Printing Inks for Non-Absorbing Substrates*. Paper presented at the Ink Makers Forum Thursday, Apr. 5, 2001.
Larsen, Edwin M; Gammill, Adrian M.: *Electronmetric Titrations of Zirconium and Hafnium Solutions*. J. Am. Chem. Soc.; 72(8); 3615-3619, 1950.

* cited by examiner

*Primary Examiner* — Patrick D Niland
(74) *Attorney, Agent, or Firm* — Foley & Lardner LLP

(57) ABSTRACT

Polymer emulsion compositions for use in printing inks and printing inks made from the compositions are provided. The emulsion compositions include an aqueous continuous phase containing water and a dissolved carboxylic acid-functional support polymer. The dispersed phase of the emulsion composition contains crosslinked, dispersed polymer particles. The emulsion compositions also include at least one multivalent metal crosslinker and at least one stabilizing agent. The polymer emulsion compositions display superior printability properties in inks and other coatings formulated with them, yet are stable at elevated temperatures for long periods of time.

37 Claims, 3 Drawing Sheets
(3 of 3 Drawing Sheet(s) Filed in Color)

Print 0

Stop Print

Print 1 (75% recovery)

Print 10 (90% recovery)

Print 20 (95% recovery)

Print 30 (95% recovery)

Print 40 (95% recovery)

Print 50 (95% recovery)

Print 60 (95-99 % recovery)

Print 70 (99% recovery)

Print 80 (100% recovery)

EMULSION COMPOSITIONS FOR USE IN PRINTING INKS

FIELD OF THE INVENTION

The invention relates to emulsion compositions containing carboxylic acid-functional support polymers, multivalent metal crosslinkers, stabilizing agents and optionally crosslinked dispersed polymer particles. In particular, this invention relates to stabilized polymer compositions, suitable for use as binders in water-based inks for printing on plastic films and other substrates.

BACKGROUND OF THE INVENTION

A variety of plastic films are used in the packaging industry for storage and shipping of goods. In many cases these plastic films are printed with text and images. Printing inks used for this purpose must meet certain end-use requirements for successful use in this application. These requirements include good printability and resistance properties. Inks used with plastic packaging must also exhibit good wetting and flow properties and fast drying times.

Due to environmental and health concerns about solvent based inks, increased emphasis has been placed on the use of water-based inks for printing on films used for packaging in recent years. Water-based inks with good printability (i.e., good ink transfer and wetting, good adhesion to substrate and good image resolution) are highly desirable. Similarly, water-based inks which have good resolubility (i.e. the ability of dry ink to re-disperse in the same ink when in a wet state) are also important. For example, if a press is stopped, as water-based inks begin to dry they can undergo physical and chemical changes due to flocculation, film-coalescence, film formation, change in pH, and the like, which render these inks difficult to resolubilize. Typically, inks with good printability characteristics also have good resolubilizing properties, while inks with good resolubility do not necessarily have good printability properties. Finally, resistance of the printed or coated film to mechanical forces, water, solvents, and other chemicals is also highly desirable. However, many previous water-borne polymer coatings suffer from problems with adhesion, abrasion resistance, and water and solvent resistance.

Various multivalent metal crosslinking agents have been used as additives in water-based coatings in an effort to improve the resistance properties of the coatings. In particular, zirconium based crosslinkers have been promoted as useful additives to water-borne polymer compositions, offering high solvent and abrasion resistance. The basis of the improved wet resistance properties is believed to be linkages formed by the metal species between the polymer molecules at carboxylate and hydroxyl groups. More specifically, it is believed that the carboxylate groups are directly bound to, e.g., the zirconium cations upon evaporation of water and other volatile constituents. The reaction is irreversible under normal coating conditions. In contrast, hydroxyl groups on the polymer likely hydrogen bond with hydroxyl groups attached to the zirconium ion. In either case, the exact nature of the metal crosslinking species (usually in the form of polymeric complexes) will depend on the amount of metal crosslinker present, the nature of the polymer, and the pH of the system, among other variables.

Despite their advantages, metal crosslinkers such as zirconium crosslinkers suffer from chemical and colloidal stability problems. For example, ammonium zirconium carbonate (AZC) is susceptible to oxolation, a process through which an insoluble polymer of zirconium oxide is formed. This problem is exacerbated at dilute concentrations of AZC such as typically would be used with a water-borne polymer. In fact, a manufacturer of an aqueous solution of AZC (BACOTE 20, having 14.8% Zr metal) recommends that AZC be added as the last ingredient to a formulation and not be mixed with any other material or otherwise diluted prior to use. The instability of zirconium agents such as AZC severely limits their use in water-based coatings.

Thus there is a need for water-based coatings, especially inks, which have good wetting, drying speed, flow behavior, printability, and resistance properties when used for printing on plastic films and other substrates. Furthermore, such coatings must be stable upon storage and under normal conditions of use. The water-based inks and coatings of this invention exhibit these and other desirable properties when used on plastic films and other substrates.

SUMMARY OF THE INVENTION

Polymer emulsion compositions for use in printing inks and printing inks made from the polymer emulsion compositions are provided. The emulsion compositions include an aqueous continuous phase containing water and a dissolved carboxylic acid-functional support polymer. The emulsion compositions also include at least one multivalent metal crosslinker and at least one stabilizing agent. Optionally, the dispersed phase of the emulsion composition may contain crosslinked, dispersed polymer particles. The polymer emulsion compositions display superior printability properties in inks and other coatings formulated with them, yet are stable at elevated temperatures for long periods of time.

The carboxylic acid-functional support polymers are typically low molecular weight alkali soluble resins. The carboxylic acid-functional support polymers are characterized by acid numbers and oxygen contents that allow them to provide stable, high quality inks when present in sufficient concentrations in the emulsion compositions. Typically, the carboxylic acid-functional support polymers will have acid numbers of at least about 120 mg KOH/g polymer and oxygen contents of at least about 10 wt. % of the support polymer.

The multivalent metal crosslinkers are multivalent metals or metal complexes that crosslink individual carboxylic acid-functional support polymer molecules to each other. These multivalent metal crosslinkers serve to render inks made from the emulsions water-insoluble after they have been printed onto a substrate.

The stabilizing agents assist in the stabilization of the multivalent metal crosslinkers and help to promote storage stability by preventing premature crosslinking and, therefore, premature water-insolubility of the dispersed polymer particles which would impair print quality. The stabilizing agents are compounds that include functional groups that stabilize the multivalent metal ions. Such functional groups include hydroxy and carboxy groups as well as other functional groups such as oxo, amino, thiol, cyano and nitro.

The dispersed polymer particles are typically polymerized from acrylic or methacrylic ester monomers and/or vinylic monomers and either self-crosslinkable monomers (e.g., acrylamide or acetoacetoxy-functional monomers), crosslinking monomers (e.g., polyfunctional acrylate, methacrylate or vinylic monomers) or combinations thereof.

The carboxylic acid-functional support polymers and the dispersed polymer particles may be made using well-known polymerization techniques, including batch, continuous and semi-continuous polymerizations. The dispersed polymer particles may be polymerized in the presence of solubilized, partially solubilized, or unsolubilized carboxylic acid-functional support polymer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIG. 1, "Print 0" was the original print. The "Stop Print" was taken after stopping the press for 5 minutes. The other prints in FIG. 1 show less than complete recovery.

FIG. 2 contains prints with incomplete recovery.

Figure 3:
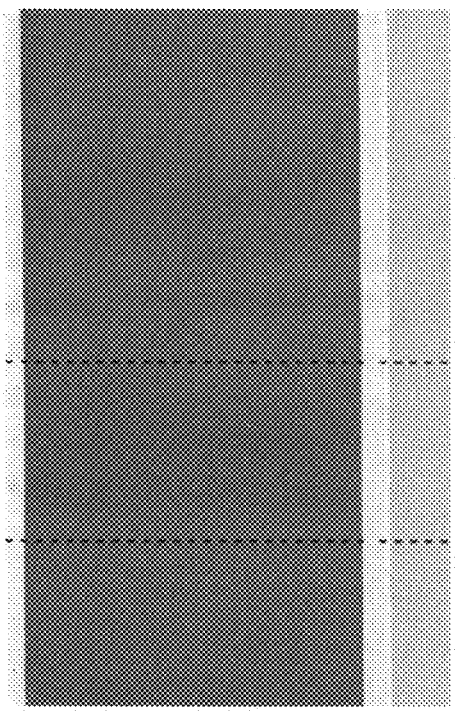
Figure 3:
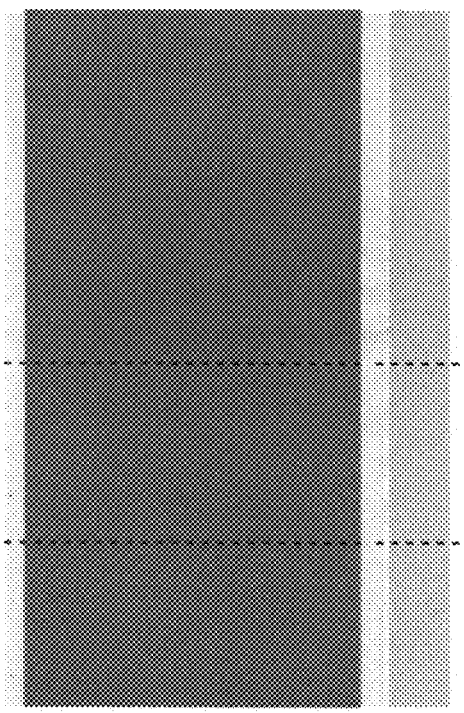
Figure 3:
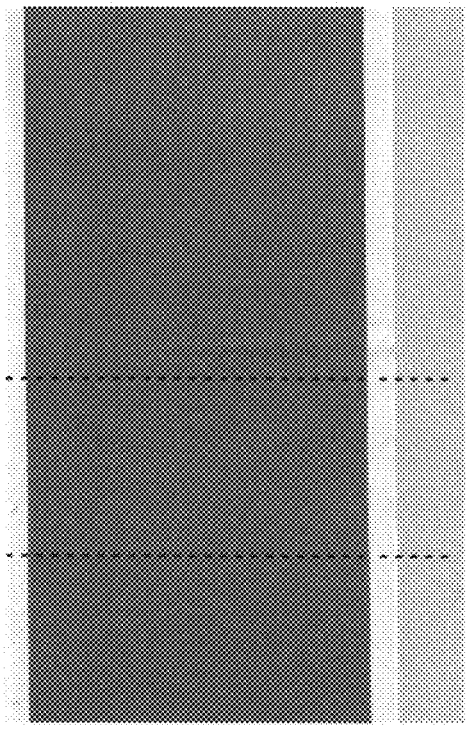

"Print 80" shown in FIG. 3 was considered to have complete recovery.

DETAILED DESCRIPTION OF THE INVENTION

In one aspect, the present invention provides a polymer emulsion composition for use in printing inks. The continuous phase of the emulsion is an aqueous phase containing water and a dissolved carboxylic acid-functional support polymer. The support polymer serves to enhance the resolubility of inks made from the emulsions. In some embodiments, the dispersed phase of the emulsion composition contains crosslinked, dispersed polymer particles. These polymer particles provide film-formation in inks made from the emulsions. The emulsion compositions also include at least one multivalent metal crosslinker and at least one stabilizing agent. The polymer emulsion compositions display superior printability properties in inks and other coatings formulated with them, yet are stable at elevated temperatures for long periods of time.

The carboxylic acid-functional support polymer fulfills a dual function in the present compositions. In the preparation of the compositions, it adds to the colloidal stability of the emulsion. In addition, when the compositions are used in inks, the carboxylic acid-functional support polymer adds to the printing and resistance properties of the ink. For example, in conjunction with the multivalent metal crosslinkers, the carboxylic acid functionalities in the carboxylic acid-functional support polymer provide metal/carboxylate crosslinks.

Without wishing or intending to be bound to any particular theory of the invention, the inventors believe that in some embodiments, the carboxylic acid-functional support polymer may initially provide a membrane around dispersed polymer particles in the dispersed phase which helps provide reversibility and resolubility during the initial stages of drying. At a later stage in the drying process, the carboxylic acid-functional support polymer forms a continuous polymer film in the presence of a multivalent metal crosslinker. The continuous film contains domains of the dispersed polymer particles. As the drying process progresses, the carboxylic acid-functional support polymer eventually loses the ability to resolubilize, due to the crosslinking action of the multivalent metal crosslinker.

Printability is an important property of the emulsion compositions of the present invention. Printability refers to a combination of the transfer, wetting, adhesion and image resolution properties of a composition. The emulsion compositions provided herein allow for better printability than other polymer compositions presently available for use in ink formulations. Printability may be measured and quantified by a laboratory gravure printing set-up. Using such a set-up, the measure for printability is the number of prints required to regain the original printing image quality after a defined print-stop. Values for printability can range from a theoretical low of 1 print on up into the hundred of prints or even more. For the purposes of this disclosure and the claims which follow, the printability of a composition is defined in terms of the following "Printability Test." The Printability Test uses a Moser type flexographic or gravure printing press. After reaching printing equilibrium, the press is stopped for 5 minutes, then restarted and the number of prints needed to reproduce the original printing quality is counted. The press is run at 20 m per min. A white polyethylene substrate with a surface tension of 38-42 dyne is used. The water-based ink is printed using a two-roll printing station. The gravure cylinder has 120 lines per cm. The impression roll has a hardness of 750, a shore printing pressure of 1 bar and measured contact area of 9 mm. An in-line Corona treatment of 500 W is used. Printing is done in a climate controlled room maintained at 50% relative humidity and 22° C. Thermostatically controlled drying ovens set at 60° C. are used after printing station. As measured according to this Printability Test, printing inks made from the emulsion compositions provided herein are capable of restoring at least 95% of original print image quality in 100 prints or fewer. This includes embodiments where printing inks made from the emulsion compositions provided herein are capable of restoring at least 95% of original print image quality in 50 prints or fewer, further includes embodiments where printing inks made from the emulsion compositions provided herein are capable of restoring at least 95% of original print image quality in 20 prints or fewer, and still further includes embodiments where printing inks made from the emulsion compositions provided herein are capable of restoring at least 95% of original print image quality in 10 prints or fewer. This further includes embodiments where printing inks made from the emulsion compositions provided herein are capable of completely restoring the original print image quality in less than or equal to 100 prints, less than or equal to 50 prints, less than or equal to 20 prints, or even less than or equal to 10 prints.

This printability measurement is distinguishable from reversibility or resolubility tests that are often encountered in the literature, as those methods are static methods that do not involve transfer of liquid onto a substrate. The printability described here involves dynamic conditions and the transfer of ink onto a substrate, and more closely approximates the actual conditions encountered during gravure or flexographic printing operations.

Another feature of the emulsion compositions provided herein is that they are storage stable for extended periods of time, even at elevated temperatures. These storage stable emulsion compositions exhibit little or no change in their viscosity upon storage for periods of weeks. This represents a significant advance in emulsion compositions that include multivalent metal crosslinkers, because these crosslinkers commonly lead to premature crosslinking, rapid viscosity increases and gellation. The present emulsion compositions will typically have viscosities in the range of about 20 to 10,000 mPas. This includes emulsion compositions having a viscosity in the range of about 50 to 1000 mPas, and further includes emulsion compositions having a viscosity of about 100 to 500 mPas.

For the purposes of this invention, viscosities are measured by aging the emulsion compositions in a forced-air oven at 40° C. in a screw-top bottle. Prior to the initial viscosity measurements, the emulsion compositions are allowed to equilibrate at 25° C. for 2 hours. A Brookfield Viscometer is used to measure viscosity. An emulsion composition is considered to have acceptable storage stability if that composition does not gel after storage for 8 days at 40° C.

The storage stability of the emulsion compositions depends, at least in part, on the acid number and oxygen content of the carboxylic acid-functional support polymer and the amount of carboxylic acid-functional support polymer present in the emulsion. Acid number is a measure of the amount of potassium hydroxide in milligrams that is required to neutralize one gram of an acid medium. Generally, a higher oxygen content and acid number provide greater stability. Increased support polymer content tends to promote good printability. The present compositions strike a balance between these factors to provide polymer emulsion compositions for use in printing inks that exhibit both good printability and long-term storage stability.

For stability reasons, therefore, carboxylic acid-functional support polymers having a minimum oxygen content and/or a minimum acid number may be desirable. For example, in some embodiments the carboxylic acid-functional support polymers will have an oxygen content of at least about 10 wt. % (e.g., about 10 wt. % to about 30 wt. %). This includes embodiments where the carboxylic acid-functional support polymers have an oxygen content of at least about 20 wt. % (e.g., about 20 to 30 wt. % or about 20 to 25 wt. %). The acid number for the carboxylic acid-functional support polymers in some exemplary compositions may be at least about 60 mg KOH/g polymer. This includes embodiments where the acid number is at least about 100 mg KOH/g polymer, further includes embodiments where the acid number is at least about 120 mg KOH/g polymer and still further includes embodiments where the acid number is at least about 140 mg KOH/g polymer. For example, the carboxylic acid-functional support polymers may have an acid number of about 120 to 220 mg KOH/g polymer. The acid number values provided herein refer to the acid numbers for the dry carboxylic acid-functional support polymers.

By way of guidance and illustration, the relationship: $AN \geq -13.33 \times OC + 460$ (where AN=acid number and OC=oxygen content) may be used to select and design carboxylic acid-functional support polymers that have a desirable acid number and oxygen content, although the present emulsion compositions are not limited to those whose acid numbers and oxygen contents are described by this relationship.

Suitable carboxylic acid-functional support polymers include acrylic, vinyl (including styrenyl), or vinyl/acrylic polymers, or blends thereof. Vinyl/acrylic emulsion polymers such as styrene/acrylic emulsion polymers are particularly suitable. The carboxylic acid-functional support polymers may be low molecular weight soluble resins, including alkali soluble resins. When an alkali soluble resin is employed as the carboxylic acid-functional support polymer, it is typically partially incorporated, partially adsorbed and partially in solution. The carboxylic acid-functional support polymers typically have number average molecular weights (Mn) of no greater than about 20,000 g/mol and, in some cases, no more than about 10,000 g/mol, as measured by gel permeation chromatography. For example, the support polymers may have number average molecular weights ranging from about 1500 to 20,000 g/mol. This includes embodiments where the carboxylic acid-functional support polymers have an Mn of about 1500 to 8000 g/mol, further includes embodiments where the carboxylic acid-functional support polymers have an Mn of about 2500 to 6500 g/mol and still further includes embodiments where the carboxylic acid-functional support polymers have an Mn of about 3500 to 4500 g/mol.

The Tg of the carboxylic acid-functional support polymers may vary over a wide range. In some illustrative embodiments, carboxylic acid-functional support polymers (e.g. alkali soluble acrylic resins) having a Tg of at least about 0° C. are used. This includes embodiments where the carboxylic acid-functional support polymers have a Tg of at least about 20° C. and further includes embodiments where the carboxylic acid-functional support polymers have a Tg of at least about 30° C. For example, some carboxylic acid-functional support polymers may have a Tg between about 5° C. and 150° C.

The preparation of acrylic polymers which may be employed as carboxylic acid-functional support polymers is well known to those skilled in the art. Generally such polymers are prepared with ethylenically unsaturated monomers, and initiators, and optionally with surfactants, alkali, and water or another reaction solvent. Exemplary monomers include but are not limited to acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylolacrylamide, glycidyl acrylate, glycidyl methacrylate, vinyl esters, vinyl chloride, and the like.

The dispersed phase of the emulsion compositions provided herein may contain crosslinked, dispersed polymer particles. There are two basic designs for these polymer particles. In one design, the polymer particles are polymerized from one or more monomers having self-crosslinkable functionalities, where a self-crosslinkable functionality is a functionality that is able to provide crosslinks between polymer chains through a crosslinking agent that reacts with the self-crosslinkable functionalities. In some embodiments the self-crosslinkable functionalities may partially react during the addition of the crosslinking agent and more completely react during the drying of the film. For example, the polymer particles may be polymerized from keto- or aldehyde-containing amide-functional monomers such as diacetone acrylamide (DAAM) that react with di- or polyamine or dihydrazide crosslinking agents. Other examples of self-crosslinkable monomers from which the polymer particles may be polymerized include monomers having acetoacetoxy functional groups (e.g., acetoacetoxymethacrylate (AAEM) or acetoacetoxy ethyl acrylate (AAEA)) which crosslink with di- or poly-amine crosslinking agents. Other examples of self-crosslinking monomers from which the polymer particles may be polymerized include monomers having carboxylic acid functional groups such as acrylic or methacrylic acid which crosslink with metal-containing crosslinking agents such as zirconium containing crosslinking agents. In some embodiments, self-crosslinkable monomers account for at least about 0.5 wt. % of the dispersed polymers.

In a second design, the dispersed polymer particles are polymerized from one or more monomers having crosslinking functionalities. A crosslinking functionality is one that is capable of undergoing interchain crosslinking without the aid of an external crosslinking agent. Upon drying, the crosslinking functionalities react to provide interchain crosslinks. Suitable crosslinking monomers include, but are not limited to, polyfunctional acrylate, methacrylate or vinylic monomers. Specific examples of suitable monomers include diethylene glycol diacrylate, ethylene glycol dimethacrylate (EGDMA), diethylene glycol dimethacylate, ethylene glycol diacrylate, trimethylolpropane triacrylate (TMPTA), trimethylol propane trimethacrylate, hexanediol diacrylate and divinyl benzene. In some embodiments, crosslinking monomers account for at least about 0.5 wt. % of the polymeric polymers.

Other monomers that may be used to polymerize the polymer particles of the dispersed phase include, but are not limited to, acrylic and methacrylic esters, such as ethyl methacrylate, methyl methacrylate, butyl acrylate, butyl methacrylate, 2-ethylhexyl acrylate, ethyl acrylate, methyl acrylate, 2-hydroxyethyl methacrylate, 2-hydroxyethyl acrylate, glycidyl acrylate, and glycidyl methacrylate monomers and vinylic monomers, such as vinyl acetate. In some embodiments, the monomer mixture used to polymerize the polymer particles of the dispersed phase is free of carboxylic acid-functional monomers, such as acrylic acid or methacrylic acid monomers. In other embodiments, the monomer mixture used to polymerize the polymer particles of the dispersed phase will include carboxylic acid-functional monomers. In these embodiments, the polymer particles may crosslink with the carboxylic acid-functional support polymers via the multivalent metal crosslinkers.

Polymer particles having low Tgs may be employed in the dispersed phase. For example, the emulsion compositions may be formulated from dispersed polymer particles having a Tg of no more than about 20° C. However, in order to avoid premature film formation in inks made from the emulsions, it is generally desirable to include more of the carboxylic acid-functional support polymer as the Tg of the dispersed polymer particles decreases. For example, in some exemplary compositions, the carboxylic acid-functional support polymer accounts for at least about 10 weight percent (wt. %), desirably at least about 15 wt. % and more desirably at least about 20 wt. % of the total dry weight of the carboxylic acid-functional support polymer plus the dispersed polymer particles. For example, in some of the emulsion compositions provided herein, the carboxylic acid-functional support polymers account for about 20 to 30 wt. % of the total dry weight of the carboxylic acid-functional support polymers and the dispersed polymer particles. Thus, some illustrative emulsions made with dispersed polymer particles having a Tg of no more than about −10° C. (e.g., a Tg of about −30° C. to −10° C.) will include at least about 45 wt. % carboxylic acid-functional support polymer, based on the total dry weight of the carboxylic acid-functional support polymer and the dispersed polymer particles. Other emulsions made with dispersed polymer particles having a Tg of no more than about 10° C. (e.g., a Tg of about −10° C. to 10° C.) will include at least about 30 wt. % carboxylic acid-functional support polymer, based on the total dry weight of the carboxylic acid-functional support polymer and the dispersed polymer particles. Still other emulsions made with dispersed polymer particles having a Tg of at least about 10° C. will include at least about 20 wt. % carboxylic acid-functional support polymer, based on the total dry weight of the carboxylic acid-functional support polymer and the dispersed polymer particles.

The relative amounts of carboxylic acid-functional support polymer and dispersed polymer particles in the emulsions also may be characterized by their weight ratio. The weight ratio (based on dry weight) of the carboxylic acid-functional support polymer to the dispersed polymer particles in the emulsion compositions may vary over a broad range. However, in some embodiments the weight ratio of carboxylic acid-functional support polymer to polymer particles is about 1:10 to 1:1. This includes embodiments where the weight ratio is about 1:9 to 1:1 and further includes embodiments where the weight ratio is about 1:9 to 1:2. Typically, compositions made from dispersed polymer particles having higher Tg values will have a smaller ratio of carboxylic acid-functional support polymer to dispersed polymer particles.

The dispersed polymer particles may have a variety of particle morphologies, depending upon the methods used in their production. For example, the particles may be homogeneous particles, core-shell particles or multilayered core-shell particles and may be produced using batch, continuous or semi-continuous emulsion polymerizations. The polymerizations may be single or multi-stage polymerizations. In some embodiments, the dispersed polymer particles have a gradient morphology wherein the level of low Tg monomers is highest in the interior of the particle and decreases toward the particle surface. Polymer particles with such a gradient morphology may be made using a power-feed emulsion polymerization. Power-feed emulsion polymerization is a semi-continuous polymerization where the instantaneous composition of the formed polymer is the same as that of the added comonomers. Typically a power-feed polymerization uses a reactor equipped with two reservoirs. Each reservoir is initially filled with a selected monomer or monomer mixture. During polymerization the contents of the first reservoir are continuously fed into the reactor under monomer-starved conditions while the contents of the second reservoir are continuously fed into the first reservoir.

The dispersed polymer particles may be polymerized in the presence of the carboxylic acid-functional support polymers. In addition, the carboxylic acid-functional support polymers and the dispersed polymer particles may be polymerized in the same reaction chamber. During the polymerization of the polymer particles, the carboxylic acid-functional support polymers may be solubilized, partially solubilized or unsolubilized. The carboxylic acid-functional support polymer may be solubilized by adding a base, such as ammonium hydroxide to the emulsion polymerization. However, because a basic environment will hinder polymerization of any carboxylic acid-functional monomers used to polymerize the dispersed polymer particles, in some instances it may be desirable to polymerize the polymer particles in the presence of an unneutralized carboxylic acid-functional support polymer in a low pH environment. Under these low pH conditions, the carboxylic acid-functional support polymers exist as support particles which serve as supports for the polymerization of the dispersed polymer particles. At some later stage, for example when the emulsion composition is formulated into an ink, the pH of the solution may be raised to fully solubilize the carboxylic acid-functional support polymers into the continuous phase.

The polymerization of the dispersed polymer particles in the presence of unneutralized carboxylic acid-functional support polymer particles has many advantages. For example, this approach to polymerization makes it possible to incorporate high levels of (meth)acrylic acid monomers into the carboxylic acid-functional support polymer and to easily adjust the oxygen content of the carboxylic acid-functional support polymer where necessary to improve printability or emulsion storage stability.

In some embodiments the emulsions and inks made from the emulsions will contain at least two different carboxylic acid-functional support polymers and, optionally, at least two different types of dispersed polymer particles. Such compositions may be produced by emulsion polymerizing polymer particles in the presence of a first carboxylic acid-functional support polymer to provide a first emulsion polymer, polymerizing polymer particles in the presence of a second carboxylic acid-functional support polymer to provide a second emulsion polymer and then combining the first and second emulsion polymers. In some exemplary embodiments, the weight ratio of the first emulsion polymer to the second emulsion polymer, based on the dry polymer content, is about 1:0.1 to 0.1 to 1. This includes embodiments where the weight ratio of the first emulsion polymer to the second emulsion polymer, based on the dry polymer content, is about 1:5 to 5:1 and further includes embodiments where the weight ratio of the first emulsion polymer to the second emulsion polymer, based on the dry polymer content, is about 1:3 to 3:1.

Multivalent metal crosslinkers are multivalent metals or metal complexes that crosslink individual carboxylic acid-functional support polymer molecules to each other. These multivalent metal crosslinkers serve to render inks made from the emulsions water-insoluble after they have been printed onto a substrate. The amount of metal crosslinker employed will vary depending upon the amount of carboxylic acid-functional support polymer and the acid number of the carboxylic acid-functional support polymer. Suitable multivalent metals include zirconium, titanium, hafnium, chromium, zinc, aluminum, or mixtures thereof. Zirconium is especially well-suited as a metal crosslinker. The metal crosslinker is typically a salt or complex of ammonia, acetate, propionate, sulfate, carbonate, nitrate, phosphate, tartrate, acetylacetonate, or any two or more thereof. Thus, exemplary metal crosslinkers include ammonium zirconium carbonate, zirconium acetylacetonate, zirconium acetate, zirconium carbonate, zirconium sulfate, zirconium phosphate, potassium zirconium carbonate, zirconium sodium phosphate, zirconium tartrate, and other combinations of the above multivalent metals and counter ions.

The amount of the metal crosslinker used in present compositions will vary with the nature of the support polymer, the nature of the multivalent metal and the required properties of the coated/printed substrate. In some compositions multivalent metal crosslinkers are present in an amount of about 1 to 15 wt. %. This includes embodiments where the multivalent metal crosslinkers are present in an about of about 1 to 5 wt. %. Expressed in molar ratios, in some embodiments, the composition has a molar ratio of carboxylate to metal crosslinker from about 10:1 to about 1:2, from about 9:1 to about 1:2, from about 8:1 to about 1:2, from about 7:1 to about 1:2, from about 6:1 to about 1:2, from about 5:1 to about 1:2, from about 4:1 to about 1:2, from about 3:1 to about 1:2, from about 10:1 to about 1:1, from about 8:1 to about 1:1, from about 6:1 to about 1:1, from about 4:1 to about 1:1, or from about 3:1 to about 1:1.

A wide variety of organic compounds may serve as stabilizing agents. The stabilizing agents assist in the stabilization of the multivalent metal crosslinkers and help to promote storage stability by preventing premature crosslinking and, therefore, premature water-insolubility of the dispersed polymer particles which would impair print quality. Many commercially available multivalent metal crosslinker compositions already include stabilizing agents. The stabilizing agents are compounds that include functional groups that stabilize the multivalent metal ions. Such functional groups include hydroxy and carboxy groups as well as other functional groups such as oxo, amino, thiol, cyano and nitro. Suitable stabilizing agents of the invention therefore include but are not limited to diols, hydroxy acids, diacids, sugars, or mixtures of two or more thereof. For example, a stabilizing agent can be tartaric acid, gluconic acid, mucic acid, saccharic acid, oxalic acid, glycolic acid, lactic acid, malic acid, citric acid, mandelic acid, malonic acid, maleic acid, succinic acid, a salt thereof, or a mixture of two or more thereof. Stabilizing agents which are sugars include mannitol, fructose, glucose, and mixtures of two or more thereof or mixtures with diols, hydroxy acids or diacids. The amount of stabilizing agent used in compositions of the invention is 1.4 mole percent or more, 2.4 mole percent or more, 3 mole percent or more, or 7 mole percent or more of the amount of cross-linking agent. Typically, the molar percentage of the stabilizing agent to metal cross-linking agent is at least 1.4, 2.4, 3, 7, 8, 9, or 10 mole percent to about fifty mole percent. Alternatively, the molar percentage of the stabilizing agent of metal cross-linking agent is at least 1.4, 2.4, 3, 7, 8, 9, or 10 to about 40 mole percent or at least 1.4, 2.4, 3, 7, 8, 9, or 10 to about 30 mole percent or is at least 1.4, 2.4, 3, 7, 8, 9, or 10 to about 20 mole percent.

Stabilized emulsion compositions in accordance with the present invention can also include a variety of additives such as surfactants, leveling agents, rheology agents, waxes, buffering agents, dispersing agents, defoaming agents, antifoaming agents, rewetting agents, biocides, and other additives known to those of skill in the art. A wide range of surfactants are suitable for use including anionic, cationic, nonionic, and reactive surfactants. Typically, anionic surfactants include alkyl sulfonates, alkylaryl sulfonates, alkyl sulfates, sulfates of hydroxyalkanols, alkyl and alkylaryl disulfonates, sulfonated fatty acids, sulfates and sulfonates of polyethoxylated alkanols and alkylphenols as well as esters of sulfosuccinic acid. Typically, cationic surfactants include quaternary ammonium salts and various alkyl amine salts. Suitable nonionic surfactants include nonphenol ethoxylates and secondary alcohol ethoxylates such as: TERGITOL™ 15-S-40, TERGITOL™ 15-S-30, TERGITOL™ 15-S-50, TERGITOL™ NP-40, TERGITOL™ NP-30, and TERGITOL™ NP-50 (all available from Dow Chemicals, Midland, Mich.). In addition, reactive (i.e. polymerizable) surfactants can be incorporated into the polymer compositions and include polyethoxylated alkyl phenyl ethers such as NOIGEN™ RN-4065, NOIGEN™ RN-40, and sulfates thereof (e.g., HITENOL™ BC-2020) (Dai-Ichi Kogyo Seiyaku Co., Ltd., Japan). Other ionic, nonionic, and reactive surfactants are described in U.S. Pat. No. 5,539,073, the entire disclosure of which is hereby incorporated by reference.

Although the present compositions are particularly well-suited for use as binders in ink formulations, they may also be employed in other applications, including top coating agents for plastics, overprint varnishes, paints, adhesives, fillers, molding materials, electronic materials such as resists, or the like. Thus, an overprint varnish, a paint or a heat seal lacquer may each independently include a stabilized polymer emulsion composition as described herein.

Also provided are methods for printing by printing an ink made from the present emulsion compositions onto a substrate. Suitable inks include water-based inks made from the present compositions mixed with one or more pigments or colorants. Such inks are particularly well-suited for printing on flexible substrates, such as plastic substrates. Suitable printing processes include offset printing, gravure offset printing, and gravure and flexographic printing processes.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

All patents and publications described herein are incorporated by reference in their entirety for all purposes.

EXAMPLES

The following non-limiting examples serve to further illustrate advantages of the disclosed invention.

Measurements and Equipment:

The various measurements presented in the tables that follow were obtained according to the following procedures.

For resistance properties testing, inks were applied by a 6μ wire rod onto a Corona treated white polyethylene (PE) film. In case of "A-drying," the coated substrates were dried for 60° C. in an oven and directly tested. Wet resistance properties were determined by immersing the coated substrate for 2 hrs at room temperature in water. Before testing, the coated substrates were mildly dried with a tissue. "B-drying" was A-drying, followed by leaving the printed substrate in the open air overnight in ambient conditions.

Adhesion tests were performed using a SCOTCH brand (3M Company) No. 610 tape. The rub test was done by rubbing the coated substrate with wet felt pads. The "Wet SATRA" was tested using a SATRA rub fastness tester and the tabulated values were reported as A/B where A is the number of revolutions and B the percent of ink left on the substrate.

The wet crinkle test was done by fiercely crinkling the coated substrate face to face under running water for 30 seconds. The scores for adhesion, rub and crinkle were rated 0 to 5, 5 being best (no damage to the coated substrate) to 0 being worst (all ink removed).

Figure 1:
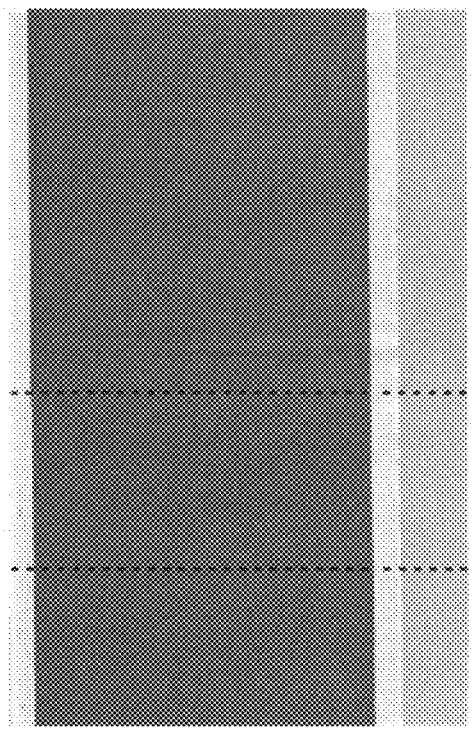
FIGS. 1, 2 and 3 show prints obtained with a composition in accordance with this invention.
Figure 1:
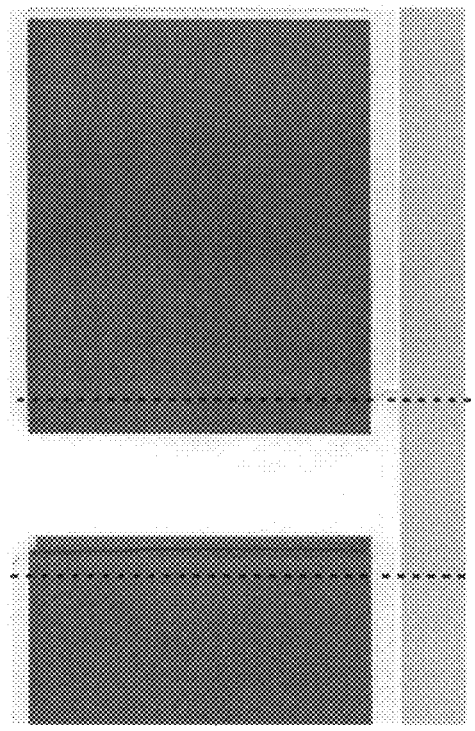
Figure 1:
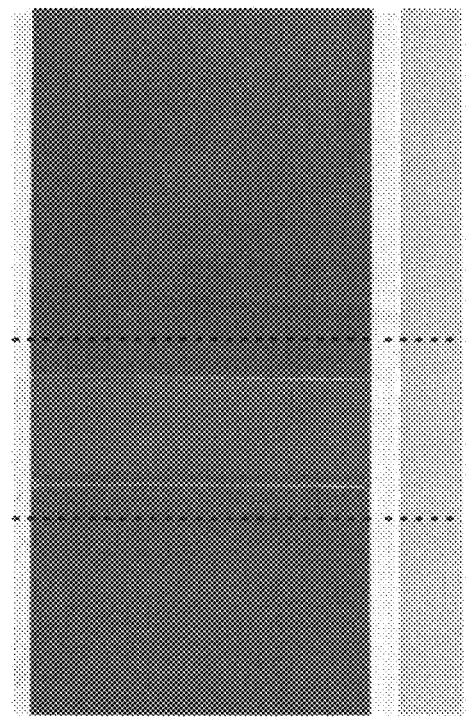
Figure 1:
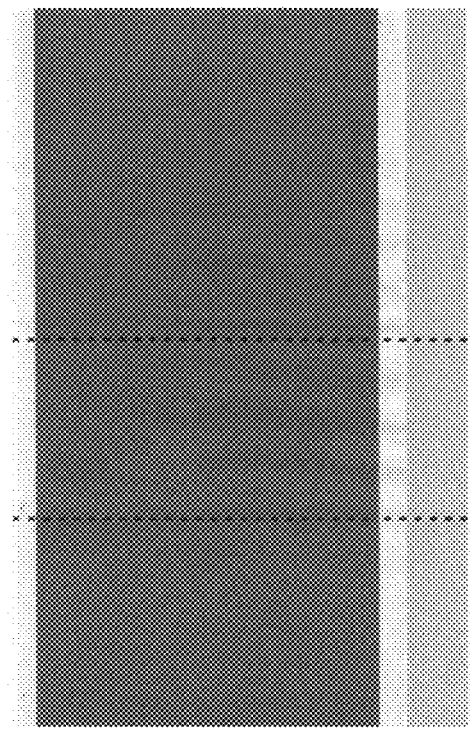
Figure 2:
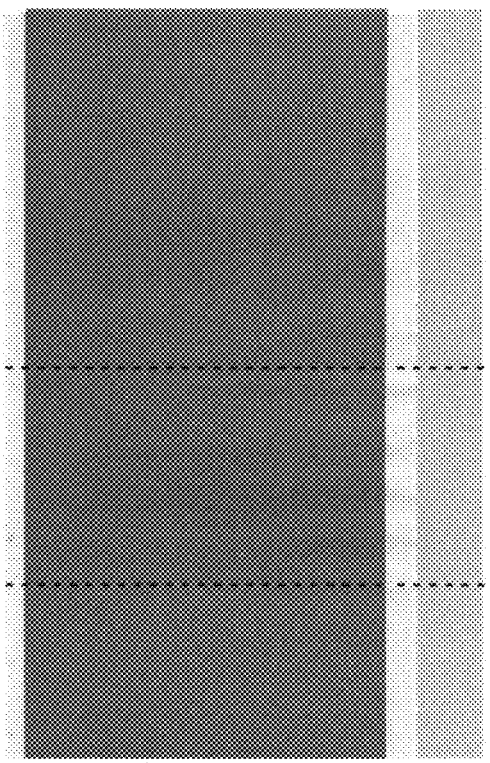
Figure 2:
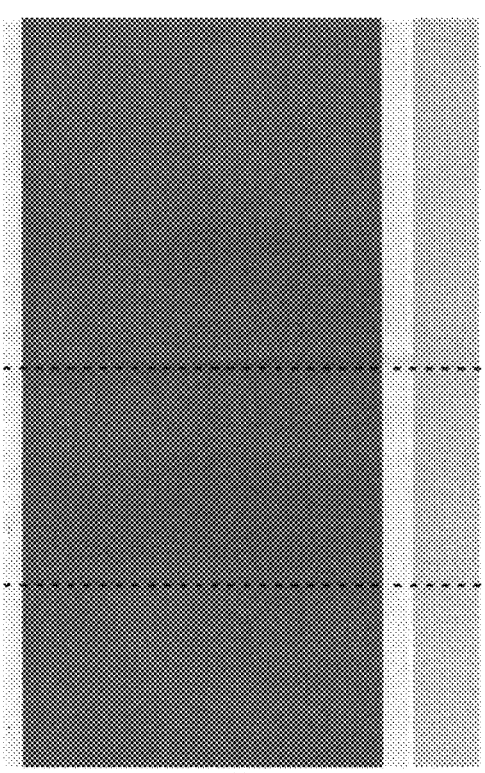
Figure 2:
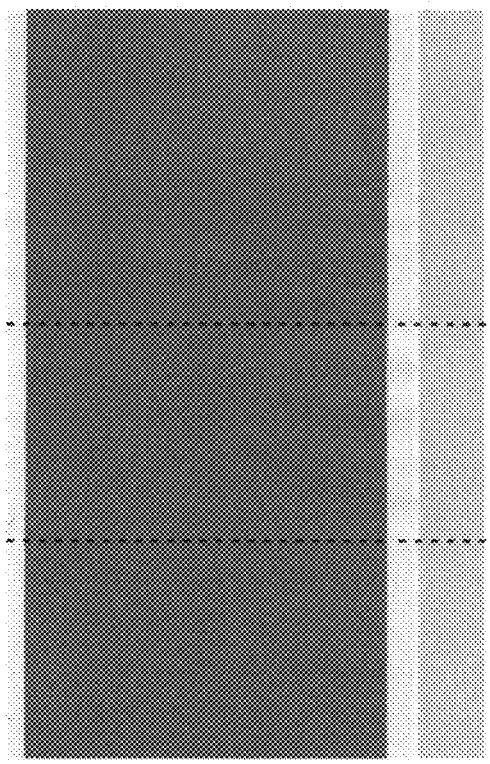
Figure 2:
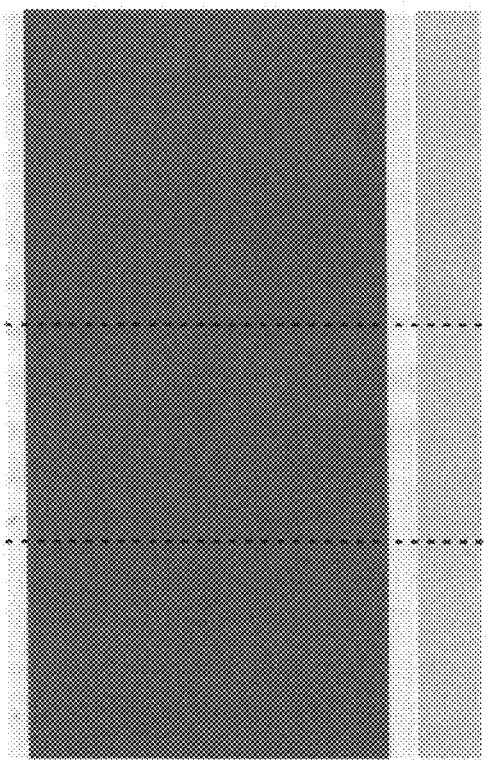

Printability was measured using the Printability Test on a Moser type laboratory gravure printing set-up. The measure for printability was the number of prints required to regain equal printing image quality after a print-stop of 5 minutes. This printability measurement involved dynamic conditions and transfer of ink onto different substrates and, moreover, approached the conditions encountered during gravure or flexo printing. Printability was measured on a Moser type printing press (Tief- and Flexodruckmaschine Rototest MC-NR 544). Printing was done in a climate controlled room maintained at a relative humidity of 50% and 22° C. A white polyethylene film with a surface tension (KIVO) of 38-42 dynes was used with in-line Corona treatment of 500 W. The press was run at 20 meters (m) per minute (min). The water-based ink was printed using a two-roll printing station. The gravure cylinder had 120 lines per cm (Winkler 0, 70°). The impression roll had a hardness of 75°, a shore printing pressure of 1 bar and measured contact area of 9 mm. Thermostatically controlled drying ovens set at 60° C. were used after the printing station. Using this test for printability, a visual examination of prints was used to measure the printability. The number of prints required to regain print quality equal to the original print was measured. FIGS. 1, 2 and 3 show prints obtained with a composition in accordance with this invention. In FIG. 1, "Print 0" was the original print. The "Stop Print" was taken after stopping the press for 5 minutes. The other prints in FIG. 1 show less than complete recovery. FIG. 2 contains prints with incomplete recovery. "Print 80" shown in FIG. 3 was considered to have complete recovery.

Viscosities were measured using a Brookfield viscometer with appropriate spindle number and rotation speed as outlined in the instruction manual for the instrument. Gel Permeation Chromatography (GPC) was used to measure the molecular weights of the polymers.

Example 1

Preparation of Support Polymers

The support polymer compositions given in Table 1 were prepared using a continuous polymerization process as described in U.S. Pat. Nos. 4,546,160; 4,414,370; and 4,529,787, the entire disclosures of which are incorporated herein by reference Unless otherwise stated, the numbers in Table 1 represent weight percent.

TABLE 1

| | Support Polymers (SP) | | | |
|---|---|---|---|---|
| | SP-1 | SP-2 | SP-3 | SP-4 |
| COMPONENTS | | | | |
| Acrylic Acid | 10.5 | 20.0 | 34.4 | 33.6 |
| Butyl Acrylate | 32.4 | 25.4 | | |
| alpha-Methyl Styrene | 0.0 | 39.1 | 31.5 | 35.6 |
| Styrene | 16.7 | 15.5 | 34.1 | 25 |
| Methacrylic Acid | 12.5 | | | |
| n-Butyl Methacrylate | 27.9 | | | |
| 2-Ethyl hexylacrylate | | | | 5.8 |
| TOTAL | 100.0 | 100.0 | 100.0 | 100.0 |
| PROCESS CONDITIONS | | | | |
| Reactor Temperature (° C.) | 207 | 210 | 212 | 217 |
| Residence Time (min.) | 12 | 12 | 12 | 12 |
| MOLECULAR WEIGHTS | | | | |
| Mw | 6250 | 6800 | 10000 | 9000 |
| Mn | 2400 | 3500 | 3200 | 3000 |

TABLE 1-continued

| Support Polymers (SP) | | | | |
|---|---|---|---|---|
| | SP-1 | SP-2 | SP-3 | SP-4 |
| Acid Number (mg KOH/g polymer) | 144 | 140 | 215 | 220 |
| Oxygen Content (wt. % of polymer) | 23 | 15.7 | 14.8 | 15.1 |
| Tg (° C.) | 29 | 89 | 123 | 117 |

Example 2

Preparation of Emulsion Polymers Using Support Polymers

Emulsion polymers given in Table 2 were prepared from polymer particles polymerized in the presence of the support polymers of Table 1. A solution of support polymer, ammonia (25%) and de-ionized (DI) water was brought to 85° C. in a 2 L 4-neck round bottom flask under a mild flow of nitrogen. A mixture of monomers was prepared and charged to the reactor. Next, ammonium persulfate (APS) dissolved in deionized (DI) water was charged to the reactor. After 15 minutes, the remaining monomer mixture was supplied to the reactor over 45-60 minutes. During the process, the temperature remained at 85° C. After this, the reactor contents remained under these conditions for 60 minutes to reduce residual monomer content. After this hold-period, the emulsion was cooled and adipic dihydrazide was added if used in the formula. The emulsion was mixed for an additional 15 minutes and subsequently filtered. Unless otherwise stated, the numbers in Table 2 represent weight in grams (g).

TABLE 2

| Formulation Emulsion Polymers (EP) | | | | | |
|---|---|---|---|---|---|
| | EP-1 | EP-2 | EP-4 | EP-5 | EP-6 |
| COMPONENTS | | | | | |
| SP-2 | | 80.00 | | | |
| SP-1 | 65.0 | | | | |
| SP-3 | | | | 113 | |
| SP-4 | | | 190 | | 131 |
| Ammonia (25%) | 11.4 | 13.60 | 50.1 | 28.4 | 39.7 |
| DI Water | 428.5 | 508.50 | 376.2 | 257.6 | 259.3 |
| Diacetoneacrylamide (DAAM) | 12.3 | 10.00 | | | |
| Softanol 90* | | | 5 | | 12.9 |
| Methyl Methacrylate (MMA) | 10.4 | 12.96 | 56.7 | | 138 |
| Butyl Acrylate (BA) | | 9.16 | 113.5 | | 30 |
| 2-Ethyl Hexylacrylate (2-EHA) | 13.5 | 9.87 | 56.7 | 239.5 | 167 |
| n-Butyl Methacrylate (n-BMA) | 17.8 | | | 77.6 | |
| Ammonium Persulfate (APS) | 1.7 | 3.00 | 3.8 | 2.7 | 2.9 |
| DI Water | 28.3 | 30.00 | 140.3 | 256.2 | 211.9 |
| MMA | 93.6 | 116.64 | | | |
| BA | | 82.44 | | | |
| 2-EHA | 121.5 | 88.83 | | | |
| n-BMA | 159.9 | | | 25 | |
| DI Water | 30.0 | 30.00 | 7.7 | | 7.3 |
| Adipic Dihydrazide (ADH) | 6.2 | 5.00 | | | |
| Total | 1000.0 | 1000.00 | 1000 | 1000 | 1000 |
| EMULSION PROPERTIES | | | | | |
| Solids, % | 49.5 | 41.5 | 42.0 | 45.5 | 47.0 |
| pH | 8.3 | 8.1 | 7.7 | 7.8 | 8.1 |
| Viscosity (mPas) | 375 | 120 | 550 | 450 | 600 |

*Softanol 90 is an alcohol ethoxylate (INEOS Inc, England)

Example 3

Evaluation of Inks Made from Emulsions of Example 2

From the emulsions of Example 2, inks were prepared by blending 60 parts emulsion polymer with 30 parts of a phthalocyanine blue pigment concentrate (PC), 5 parts of JONWAX™ 35 (wax emulsion, JOHNSON POLYMER LLC, Sturtevant, Wis.) and 5 parts of iso-propanol. For all inks an additional 5 parts of BACOTE 20 was added. The pigment concentrate (PC) was made from 30 wt. % of JONCRYL™ 690 (pigment dispersant resin, JOHNSON POLYMER LLC, Sturtevant, Wis.), 35 wt. % of phthalocyanine blue 15:3, 1 wt. % of TEGO FOAMEX™ 805 (anti-foam agent, TEGO Chemie) and 34 wt. % DI water. Selected properties of the inks are given in Table 3.

TABLE 3

| Properties of Inks | | | | | | | |
|---|---|---|---|---|---|---|---|
| Ink | Emulsion Polymer in Ink | Drying Condition | Dry Adhesion | Wet Adhesion | Wet Rub | Wet SATRA | Wet Crinkle |
| I-2 | EP-2 | B | 5 | 5 | 5 | 100/95 | 4 |
| I-4 | EP-4 | A | 5 | 1 | 1 | 10/0 | 1 |
| I-4 | EP-4 | B | 5 | 5 | 4.5 | 100/80 | 1.5 |
| I-5 | EP-5 | A | 4.5 | 3 | 3 | 10/0 | 1 |
| I-5 | EP-5 | B | 5 | 5 | 5 | 100/95 | 4 |
| I-6 | EP-6 | A | 5 | 1 | 1 | 10/0 | 1 |
| I-6 | EP-6 | B | 5 | 5 | 5 | 100/20 | 1.5 |
| I-5/4 A | EP-5:EP-4 (70:30 ratio) | B | 5 | 5 | 5 | 200/0 | 4.5/5 |
| I-5/6 A | EP-5:EP-6 (70:30 ratio) | B | 5 | 5 | 5 | 200/0 | 4.5/5 |

Example 4

Evaluation of Inks Made from Emulsions of Example 2

Additional inks were prepared from the emulsions of Example 2 using procedure described in Example 3. The properties of these inks, including printability, measured as described above, are given in Table 4. Drying conditions for these inks were at 60° C. in Moser tunnel and 3 days at room temperature.

TABLE 4

Properties of Inks

| Ink | Emulsion Polymer in Ink | Dry Adhesion | Wet Adhesion | Wet Rub | Wet SATRA | Wet Crinkle | Printability in # of Prints (% recovery) |
|---|---|---|---|---|---|---|---|
| I-5/4 B | EP-5:EP-4 (70:30 ratio) | 5 | 5 | 5 | 200/90 | 4.5/5 | 60 (100%) |
| I-5/6 B | EP-5:EP-6 (70:30 ratio) | 5 | 5 | 5 | 200/90 | 4.5/5 | 60 (95%) |
| I-5 B | EP-5* | 5 | 5 | 5 | 200/60 | 4.5/5 | >100 (95%) |
| I-5 C | EP-5* with additional Ammonium Tartarate** | 5 | 5 | 5 | 200/70 | 4.5/5 | >100 (95%) |

*Each ink contained 5% BACOTE ™ 20 (MEL Chemicals, UK). The amount of ammonium tartarate in this ink was 0.15 wt %.

Example 5

Inks made with Additional Support Polymer

This example demonstrates the beneficial effects of increasing the support polymer content of the inks. Inks were prepared from mixtures of the emulsions of Example 2 with additional support polymer. Thus, in addition to the support polymer already included in the emulsion polymers, SP-2 was added to the ink compositions. The ratio of emulsion polymer to additional support polymer for each ink is provided in Table 5. Unless otherwise specified, the numbers in Table 5 represent wt. %. The inks were prepared using procedure given in Example 3. Table 5 shows the ratio of emulsion polymer (from Example 2) to additional support polymer (from Example 1) used to make each ink composition. Some properties of the inks are also presented in Table 5. From these results it can be seen that an increase in the support polymer content improves the printability of the inks.

TABLE 5

Formulations and Properties of Inks

| | INK | | | | |
|---|---|---|---|---|---|
| | I-1 A | I-1 B | I-1 C | I-1 D | I-1 E |
| Ratio (EP-1:SP-2) | 100/0 | 95/5 | 90/10 | 85/15 | 80/20 |
| EP-1 | 80.0 | 76.0 | 72.0 | 68.0 | 64.0 |
| SP-2 | | 4.0 | 8.0 | 12.0 | 16.0 |
| Total INK FORMULATION (wt. %) | 80.0 | 80.0 | 80.0 | 80.0 | 80.0 |
| Pigment concentrate | 30.0 | 30.0 | 30.0 | 30.0 | 30.0 |
| EP-1 + SP-2 | 60.0 | 60.0 | 60.0 | 60.0 | 60.0 |
| Total | 90.0 | 90.0 | 90.0 | 90.0 | 90.0 |
| PROPERTIES | | | | | |
| Drying Condition | B | B | B | B | B |
| Dry Adhesion | 5 | 5 | 5 | 5 | 5 |
| Wet Adhesion | 5 | 5 | 5 | 5 | 5 |
| Wet Rub | 5 | 5 | 5 | 5 | 5 |
| Wet SATRA | 200/90 | 200/95 | 200/95 | 200/85 | 200/65 |
| Wet Crinkle | 3.5/4 | 3.5/4 | 3.5 | 3.5 | 3.5 |
| PRINTABILITY | | | | | |
| 99% Recovery | >100 | 60 | 35 | 20 | 20 |
| Full Recovery | >100 | >100 | >100 | 55 | 45 |

Example 6

Stability of Inks

In this example, the resistance properties and stability of an ink ("I-5/4° C.") formulated from a mixture of emulsion polymers EP-5 and EP-4 of Example 2 were tested over time. The ink was prepared by blending 65 parts by weight of a 70:30 mixture of EP-5 and EP-4 ("EP-5/4") with 35 parts by weight of a phthalocyanine blue pigment concentrate (PC), 0.46 parts by weight ammonium tartarate (30%) and 8.3 parts by weight BACOTE™ 20. The pigment concentrate (PC) was made from 30 wt. % of JONCRYL 690 (pigment dispersant resin, JOHNSON POLYMER LLC, Sturtevant, Wis.), 35 wt. % of phthalocyanine blue 15:3, 1 wt. % of TEGO FOAMEX™ 805 (anti-foam agent, TEGO Chemie) and 34 wt. % DI water. Several properties of the emulsion polymer mixture and the ink made therefrom, measured at different times, are presented in Table 6. The results of the stability (i.e., viscosity) measurements over time are presented in Table 7. The ink did not gel over the course of this experiment.

TABLE 6

Properties of the Ink

| | Storage Conditions | Dry Adhesion | Wet Adhesion | Wet Rub | Wet SATRA | Wet Crinkle |
|---|---|---|---|---|---|---|
| EP-5/4 | 35 days at 40° C., ink made | 5 | 5 | 5 | 200/80 | 4.5 |
| I-5/4 C | 35 days old | 5 | 5 | 5 | 200/0 | 1 |
| EP-5/4 | 42 days at 40° C., ink made | 5 | 5 | 5 | 200/80 | 4.5/5 |
| I-5/4 C | 42 days old | 5 | 4.5 | 4.5 | 40/0 | 1 |
| EP-5/4 | 49 days at 40° C., ink made | 5 | 5 | 5 | 200/80 | 4.5/5 |
| I-5/4 C | 49 days old | 5 | 3 | 3 | 10/0 | 1 |
| EP-5/4 | 56 days at 40° C., ink made | 5 | 4.5/5 | 4.5/5 | 100/0 | 1 |
| I-5/4 C | 56 days old | 5 | 1 | 1 | 10/0 | 1 |

The results in Table 6 are for inks prepared with the emulsion polymers stored for "n" number of days at 40° C. and for inks previously made from the same emulsion polymers and then also stored for n number of days at 40° C.

TABLE 7

Viscosity of the Ink
Brookfield Viscosity (mPas) after storage of . . . day(s) at 40° C.

| | Day | | | | | | | | | |
|---|---|---|---|---|---|---|---|---|---|---|
| | Initial | 1 | 7 | 14 | 21 | 28 | 35 | 42 | 49 | 56 |
| EP-5/4 Viscosity | 560 | 300 | 320 | 360 | 720 | 1280 | 1240 | 1320 | 1420 | 1560 |
| I-5/4C Viscosity | 450 | 200 | 180 | 240 | 1120 | 1050 | 1080 | 1260 | 1320 | 1380 |

Example 7

Preparation of an Emulsion Polymer

This example provides an emulsion polymer ("EP-7") made from polymer particles polymerized in the presence of a support polymer having an acid number of 140. The support polymer content of the emulsion polymer is 16 wt. %, based on the dry weight of the emulsion polymer.

To a 2-liter resin kettle equipped with a stirrer, nitrogen purge and condenser were charged 455.6 g of water, and 6.91 g of HITENOL™ BC-2020 (Dai-Ichi Kogyo Seiyaku Co., Ltd., Japan). The temperature was brought up to 85° C. then 1.70 g of ammonium persulfate dissolved in 294.1 g of water was added to the reactor. A monomer feed composed of 0.26 g of HITENOL™ BC-2020, 34.35 g of butyl acrylate, 21.43 g of styrene, 28.23 g of methyl methacrylate, 7.18 g of isooctyl mercapto propionate, and 25.26 g of methacrylic acid was fed into the reactor at 4.40 g/min. After the monomer feed, 3.40 g of ammonium persulfate dissolved in 162.35 g of water was fed into the reactor over ten minutes. After the second charge of ammonium persulfate was in the reactor, a monomer feed (near tank) initially composed of 290.1 g of butyl acrylate, 12.41 g of ethylene glycol dimethacrylate, 1.02 g of acrylic acid, and 6.73 g of methyl methacrylate was fed into the heated reactor at 6.9 g/min. A second monomer feed (far tank) composed of 159.2 g of butyl acrylate, 12.92 g of ethylene glycol dimethacrylate (EGDMA), 120.1 g of styrene, 4.96 g of methyl methacrylate, and 13.12 g of acrylic acid was fed into the near tank at 3.45 g/min. The feeds of the near tank into the reactor and far tank into the near tank were started simultaneously. After the monomer feed was completed, the contents of the reactor were held at 85° C. for 75 minutes. Ten minutes into the hold, 2.54 g of 25% ammonium hydroxide was added to the reactor (10% neutralization). After the hold, an additional 16.5 g of ammonium hydroxide was added to the reactor, and the reactor cooled to room temperature. To the reactor was then charged with stirring 4.88 g of a 30% ammonium tartrate solution and 244.2 g of BACOTE™ 20 (MEL Chemicals, UK). The contents of the reactor were filtered through a 100-mesh screen prior to storage. Solids: 43.63%; pH, 8.74; Viscosity, 800-1210 mPa/s.

Example 8

Preparation of an Emulsion Polymer

This example provides an emulsion polymer ("EP-8") made from polymer particles polymerized in the presence of a support polymer having an acid number of 140. The support polymer content of the emulsion polymer is 12.9 wt. %, based on the dry weight of the emulsion polymer.

To a 2-liter resin kettle equipped with a stirrer, nitrogen purge and condenser were charged 396 g of water, and 5.72 g of HITENOL™ BC-2020. The temperature was brought up to 85° C. then 2.43 g of ammonium persulfate dissolved in 293.36 g of water was added to the reactor. A monomer feed composed of 0.22 g of HITENOL™ BC-2020, 28.36 g of butyl acrylate, 17.69 g of styrene, 24.42 g of methyl methacrylate, 5.29 g of isooctyl mercapto propionate, and 20.38 g of methacrylic acid was fed into the reactor at 4.40 g/min. After the monomer feed, 3.60 g of ammonium persulfate dissolved in 171.9 g of water was fed into the reactor over ten minutes. After the second charge of ammonium persulfate was in the reactor, a monomer feed (near tank) initially composed of 307.2 g of butyl acrylate, 13.1 g of ethylene glycol dimethacrylate, 1.64 g of acrylic acid, and 6.57 g of methyl methacrylate was fed into the heated reactor at 7.3 g/min. A second monomer feed (far tank) composed of 164.25 g of butyl acrylate, 13.1 g of ethylene glycol dimethacrylate (EGDMA), 131.4 g of styrene, 6.24 g of methyl methacrylate, and 13.47 g of acrylic acid was fed into the near tank at 3.65 g/min. The feeds of the near tank into the reactor and far tank into the near tank were started simultaneously. After the monomer feed was completed, the contents of the reactor were held at 85° C. for 75 minutes. Ten minutes into the hold, 3.0 g of 25% ammonium hydroxide was added to the reactor (10% neutralization). After the hold, an addition 19.8 g of ammonium hydroxide was added to the reactor, and the reactor cooled to room temperature. To the reactor was then charged with stirring 4.52 g of a 30% ammonium tartrate solution and 226.2 g of BACOTE™ 20. The contents of the reactor were filtered through a 100-mesh screen prior to storage. Solids: 43.9%; pH, 8.9; Viscosity, 250 mPa/s.

Example 9

Preparation of a Support Polymer

This example provides a support polymer ("SP-5") having an acid number of 140 and an oxygen content of 24 wt. %.

To a 2-liter resin kettle equipped with a stirrer, nitrogen purge and condenser were charged 1140 g of water, and 19.0 g of HITENOL™ BC-2020. The temperature was brought up to 80° C. then 5.24 g of ammonium persulfate dissolved in 76 g of water was added to the reactor. A monomer feed composed of 0.760 of HITENOL™ BC-2020, 99.8 g of butyl acrylate, 61.2 g of styrene, 80.1 g of methyl methacrylate, 18.3 g of isooctyl mercapto propionate, and 73.2 g of methacrylic acid was fed into the heated reactor at 1.90 g/min. After the monomer feed was complete the contents of the reactor were held at 80° C. for 30 minutes, then 177.8 g of 25% ammonium hydroxide added to the reactor. The emulsion turned from an opaque white appearance to a clear transparent liquid. Solids, 20.3%; pH, 9.9; viscosity, 250 mPa/s; Tg of polymer, 43.2° C.; Mn, 3242; Mw, 7629.

Example 10

Preparation of an Emulsion Polymer

This example provides an emulsion polymer ("EP-9") made from polymer particles polymerized in the presence of a support polymer having an acid number of 140. The support polymer content of the emulsion polymer is 25.9 wt. %, based on the dry weight of the emulsion polymer. The emulsion polymer was made using a power feed process with an internal crosslinker (EGDMA) and a non-ionic surfactant (NOIGEN™ RN-4065).

To a 2-liter resin kettle equipped with a stirrer, nitrogen purge and condenser were charged 229.5 g of water, and 720.9 g of the support polymer SP-5 from Example 9. The temperature was brought up to 85° C. then 4.0 g of ammonium persulfate dissolved in 54 g of water was added to the reactor. A monomer feed (near tank) initially composed of 231.6 g of butyl acrylate, 9.86 g of ethylene glycol dimethacrylate, and 4.93 g methyl methacrylate was fed into the heated reactor at 4.11 g/min. A second monomer feed (far tank) composed of 123.2 g of butyl acrylate, 9.9 g of ethylene glycol dimethacrylate (EGDMA), 98.6 g of styrene, and 14.78 g of methyl methacrylate was fed into the near tank at 2.05 g/min. The feeds of the near tank into the reactor and far tank into the near tank were started simultaneously. After half of the total feed was in the reactor, 15.8 g of NOIGEN™ RN-4065 (Dai-Ichi Kogyo Seiyaku Co., Ltd., Japan) dissolved in 103.4 g of water was also fed into the reactor over 5 minutes while the monomer feed continued. After the monomer feed was completed, the contents of the reactor were held at 85° C. for 45 minutes, and the emulsion cooled to room temperature for storage. The contents of the reactor were filtered through a 100-mesh screen prior to storage. Solids, 40.28%; pH, 9.9. After the reaction was cooled, 4.0 g of a 30% ammonium tartrate water solution was dropped into the reactor, then 201.5 g of BACOTE™ 20 crosslinker solution. Solids: 39.1%.

Example 11

Pigment Concentrate Preparation

This example provides a pigment concentrate that may be used to make an ink in accordance with the present invention.

To a high speed disperser were added 590 g of the dispersing polymer JONCRYL™ HPD96E (pigment dispersion resin, JOHNSON POLYMER LLC, Sturtevant, Wis.), 425 g of phthalocyanine blue, 5 g of defoamer (TEGO FOAMEX™ 805), and 142.5 g of water. The materials were ground until a continuous blue pigment dispersant was formed. Polymer solids were 20.1%.

Example 12

Inks Prepared From EP-7, EP-8, and EP-9

From the emulsions of EP-7, EP-8 and EP-9 (Examples 7, 8 and 10), inks were prepared by blending 60 parts emulsion polymer with 30 parts of the pigment concentrate from Example 11, 5.3 parts of JONWAX™ 35 (wax emulsion, JOHNSON POLYMER LLC, Sturtevant, Wis.) and 5.3 parts of iso-propanol with stirring. Selected properties of the resulting inks are given in Table 8. For evaluation of printability measurements on the Moser type press, water was added to adjust the viscosity of the inks to 25 seconds using a #2 Zahn cup. Neither the emulsions nor the inks underwent gellation during the course of this experiment.

TABLE 8

Properties of Inks

| | INK | | |
|---|---|---|---|
| | I-7 | I-8 | I-9 |
| Emulsion Polymer in Ink | EP-7 | EP-8 | EP-9 |
| Dry Adhesion | 5 | 5 | 5 |
| Wet Adhesion | 5 | 5 | 5 |
| Wet Rub | 5 | 5 | 5 |
| Wet SATRA | 200/90 | 200/70 | 200/90 |
| Wet Crinkle | 4.5/5 | 4.5/5 | 5/5 |
| Printability (100% recovery) | 70-125 | 90 | 100 |
| Initial Polymer Viscosity (mPas) | 800 | 220 | 58 |
| Polymer viscosity after storage for (n) days at 40° C. | 1660 (6) | 260 (7) | 368 (21) |
| Initial ink viscosity (mPas) | 480 | 150 | 54 |
| Ink viscosity after storage for (n) days at 40° C. | 580 (6) | 480 (7) | 120 (8) |

Example 13

Ink Blends

Ink blends were made by blending two inks (Ink I-10 and Ink I-11). Ink I-10 was made from EP-4 (Example 2) and Ink I-11 was made from EP-7 (Example 7). The formulation for each ink is provided in Table 9. The inks were prepared by blending the emulsion polymer with the phthalocyanine blue pigment concentrate (PC) of Example 11, BACOTE™ 20 and ammonium tartrate. The formulations for the ink blends and various properties for the blends are provided in Table 10.

TABLE 9

| Ink Formulations | | |
|---|---|---|
| | I-10 | I-11 |
| EP-7 | 60.0 | |
| EP-4 | | 60.0 |
| Pigment Concentrate (PC) | 30.0 | 30.0 |
| BACOTE ™ 20 | 5.0 | 5.0 |
| Ammonium Tartrate (30%) | 0.33 | 0.33 |
| Total | 95.33 | 95.33 |

TABLE 10

| | Properties of Inks | | | | | | | | | | | | | |
|---|---|---|---|---|---|---|---|---|---|---|---|---|---|---|
| | INK | | | | | | | | | | | | | |
| | I-10 | | I-11 | | I-12 | | I-13 | | I-14 | | I-15 | | I-16 | |
| Ratio I-10:I-11 | 0/100 | | 100/0 | | 90/10 | | 80/20 | | 70/30 | | 60/40 | | 50/50 | |
| I-10 | 0.0 | | 60.0 | | 54.0 | | 48.0 | | 42.0 | | 36.0 | | 30.0 | |
| I-11 | 60.0 | | 0.0 | | 6.0 | | 12.0 | | 18.0 | | 24.0 | | 30.0 | |
| Total | 60.0 | | 60.0 | | 60.0 | | 60.0 | | 60.0 | | 60.0 | | 60.0 | |
| PROPERTIES (INITIAL) | | | | | | | | | | | | | | |
| Viscosity (mPas) | 230 | | 290 | | 230 | | 190 | | 190 | | 190 | | 190 | |
| Drying Condition | B | | B | | B | | B | | B | | B | | B | |
| Dry Adhesion | 5 | | 5 | | 5 | | 5 | | 5 | | 5 | | 5 | |
| Wet Adhesion | 5 | | 4.5 | | 5 | | 5 | | 5 | | 5 | | 5 | |
| Wet Rub | 5 | | 5/4.5 | | 5 | | 5 | | 5 | | 5 | | 5 | |
| Wet SATRA | 200/15 | | 50/0 | | 200/75 | | 200/75 | | 200/20 | | 200/80 | | 200/80 | |
| Wet Crinkle | 4.5 | | 1 | | 2.5 | | 2 | | 3 | | 3 | | 3 | |
| PROPERTIES (STORED 3 DAYS AT __ ° C.) | RT | 40° C. | RT* | 40° C. | RT | 40° C. | RT | 40° C. | RT | 40° C. | RT | 40° C. | RT | 40° C. |
| Viscosity (mPas) | 200 | 220 | 200 | 400 | 170 | 250 | 160 | 260 | 160 | 260 | 150 | 440 | 140 | 300 |
| Drying Condition | B | B | B | B | B | B | B | B | B | B | B | B | B | B |
| Dry Adhesion | 5 | 5 | 5 | 5 | 5 | 5 | 5 | 5 | 5 | 5 | 5 | 5 | 5 | 5 |
| Wet Adhesion | 5 | 5/4.5 | 4 | 3.5 | 5 | 5 | 5 | 5 | 5 | 5 | 5 | 4.5 | 5 | 4.5/5 |
| Wet Rub | 5 | 5 | 4/3.5 | 2/1.5 | 5 | 5 | 5 | 5 | 5 | 5 | 5 | 5 | 5 | 5 |
| Wet SATRA | 50/0 | 15/0 | 20/0 | 20/0 | 200/30 | 20/0 | 170/0 | 30/0 | 110/0 | 40/0 | 200/15 | 50/0 | 200/50 | 50/0 |
| Wet Crinkle | 4/3.5 | 2 | 1 | 1 | 5/4.5 | 3 | 2 | 2 | 3 | 3 | 3 | 2.5/3 | 2.5/3 | 1.5 |

*RT = room temperature

Example 14

Ink Made from Emulsion Polymer Blends

Inks made from emulsion polymer blends were made by blending EP-4 (Example 2) and EP-7 (Example 7) in different ratios. The formulation and selected properties for each ink are provided in Table 11. Unless otherwise stated, the numbers in Table 11 represent wt. %. The inks were prepared by blending the emulsion polymers with the phthalocyanine blue pigment concentrate (PC) of Example 11, BACOTE™ 20 and ammonium tartrate.

TABLE 11

| | Formulations and Properties of Inks | | | | | |
|---|---|---|---|---|---|---|
| | INK | | | | | |
| | I-17 | I-18 | I-19 | I-20 | I-21 | I-22 |
| Ratio (EP-7:EP-4) | 90/10 | 80/20 | 90/10 | 80/20 | 90/10 | 80/20 |
| EP-7 | 58.2 | 51.7 | 56.0 | 49.8 | 53.7 | 47.7 |
| EP-4 | 6.5 | 13.0 | 6.2 | 12.4 | 6.0 | 12.0 |
| PC (477) | 30.0 | 30.0 | 30.0 | 30.0 | 30.0 | 30.0 |
| BACOTE 20 | 5.0 | 5.0 | 7.5 | 7.5 | 10.0 | 10.0 |

TABLE 11-continued

Formulations and Properties of Inks

| | INK | | | | | |
|---|---|---|---|---|---|---|
| | I-17 | I-18 | I-19 | I-20 | I-21 | I-22 |
| Ammonium Tartrate (30%) | 0.33 | 0.33 | 0.33 | 0.33 | 0.33 | 0.33 |
| Total | 100.0 | 100.0 | 100.0 | 100.0 | 100.0 | 100.0 |
| PROPERTIES (INITIAL) | | | | | | |
| Drying Condition | B[1] | B[1] | B[1] | B[1] | B[1] | Bw |
| Drying Adhesion | 5 | 5 | 5 | 5 | 5 | 5 |
| Wet Adhesion | 5 | 5 | 5 | 5 | 5 | 5 |
| Wet Rub | 5 | 5 | 5 | 5 | 5 | 5 |
| Wet SATRA | 200/75 | 200/70 | 200/95 | 200/90 | 200/80 | 200/5 |
| Wet crinkle | 2.5 | 2 | 4.5 | 5/4.5 | 5/4.5 | 4.5 |

| PROPERTIES (STORED 4 DAYS AT __ °C.) | RT | 40° C. | RT | 40° C. | RT | 40° C. | RT | 40° C. | RT | 40° C. | RT | 40° C. |
|---|---|---|---|---|---|---|---|---|---|---|---|---|
| Viscosity (mPas) | — | — | — | — | 200 | 440 | 180 | 380 | 400 | 200 | 160 | 360 |
| Drying Condition | B | B | B | B | B | B | B | B | B | B | B | B |
| Dry Adhesion | 5 | 5 | 5 | 5 | 5 | 5 | 5 | 5 | 5 | 5 | 5 | 5 |
| Wet Adhesion | 5 | 5 | 5 | 5 | 5 | 5 | 5 | 5 | 5 | 5 | 5 | 5 |
| Wet Rub | 5 | 5 | 5 | 5 | 5 | 5 | 5 | 5 | 5 | 5 | 5 | 5 |
| Wet SATRA | 200/30 | 20/0 | 170/0 | 30/0 | 200/85 | 200/10 | 200/95 | 200/90 | 200/95 | 200/95 | 200/95 | 200/95 |
| Wet Crinkle | 5/4.5 | 3 | 2 | 2 | 5/4.5 | 4/3.5 | 5/4.5 | 4.5 | 5/4.5 | 5/4.5 | 5/4.5 | 4.5 |

| PROPERTIES (STORED 14 DAYS AT __ °C.) | RT | 40° C. | RT | 40° C. | RT | 40° C. | RT | 40° C. | RT | 40° C. | RT | 40° C. |
|---|---|---|---|---|---|---|---|---|---|---|---|---|
| Viscosity (mPas) | — | — | — | — | 220 | 860 | 200 | 680 | 200 | 780 | 180 | 680 |
| Drying Condition | — | — | — | — | B* | B* | B* | B* | B* | B* | B* | B* |
| Dry Adhesion | — | — | — | — | 5 | 5 | 5 | 5 | 5 | 5 | 5 | 5 |
| Wet Adhesion | — | — | — | — | 5 | 5 | 5 | 5 | 5 | 5 | 5 | 5 |
| Wet Rub | — | — | — | — | 5 | 5 | 5 | 5 | 5 | 5 | 5 | 5 |
| Wet SATRA | — | — | — | — | 200/10 | 200/10 | 200/90 | 200/20 | 200/95 | 200/60 | 200/95 | 200/90 |
| Wet Crinkle | — | — | — | — | 4 | 5/4.5 | 4.5 | 4/3.5 | 5/4.5 | 5/4.5 | 5/4.5 | 5/4.5 |

| PROPERTIES (STORED 49 DAYS AT __ °C.) | RT | 40° C. | RT | 40° C. | RT | 40° C. | RT | 40° C. | RT | 40° C. | RT | 40° C. |
|---|---|---|---|---|---|---|---|---|---|---|---|---|
| Viscosity (mPas) | — | — | — | — | — | — | — | — | — | — | — | — |
| Drying Condition | — | — | — | — | B | B | B | B | B | B | B | B |
| Dry Adhesion | — | — | — | — | 5 | 5 | 5 | 5 | 5 | 5 | 5 | 5 |
| Wet Adhesion | — | — | — | — | 5 | 5 | 5 | 3.5 | 5 | 5 | 5 | 5 |
| Wet Rub | — | — | — | — | 5 | 5 | 5 | 4 | 5 | 5 | 5 | 5 |
| Wet SATRA | — | — | — | — | 200/65 | 50/0 | 200/80 | 10/0 | 200/90 | 140/0 | 200/95 | 130/0 |
| Wet Crinkle | — | — | — | — | 5/4.5 | 3 | 5/4.5 | 1 | 5/4.5 | 3 | 5/4.5 | 3.5/4 |

[1]Drying conditions were 1 min at 60° C. followed by 24 hours at RT (room temperature).

The printability properties, as measured by the Printability Test, of some of the inks of Tables 8 and 11 are presented in Table 12.

TABLE 12

Printability Measurements

| INK | Viscosity, Zahn Cup #4(sec) | Printability in # of Prints (% recovery) |
|---|---|---|
| I-7 + 7.5% BACOTE 20 | 30" | 125-150 (100%) |
| I-19 | 28" | 125 (100%) |
| I-20 | 26" | 70-75 (100%) |

Example 15

Preparation of an Emulsion Polymer

This example provides an emulsion polymer ("EP-10") made from polymer particles polymerized in the presence of a support polymer having an acid number of 140. The support polymer content of the emulsion polymer is 15.8 wt. %, based on the dry weight of the emulsion polymer. No surfactant was used in the production of the emulsion polymer.

To a 2-liter resin kettle equipped with a stirrer, nitrogen purge and condenser were charged 455.6 g of water. The temperature was brought up to 85° C. then 1.70 g of ammonium persulfate dissolved in 294.1 g of water was added to the reactor. A monomer feed composed of 34.4 g of butyl acrylate, 21.4 g of styrene, 28.2 g of methyl methacrylate, 7.2 g of isooctyl mercapto propionate, and 25.27 g of methacrylic acid was fed into the reactor at 4.40 g/min. After the monomer feed, 3.4 g of ammonium persulfate dissolved in 162.4 g of water was fed into the reactor over ten minutes. After the second charge of ammonium persulfate was in the reactor, a monomer feed (near tank) initially composed of 290.1 g of butyl acrylate, 12.4 g of ethylene glycol dimethacrylate, 1.0 g of acrylic acid, and 6.73 g of methyl methacrylate was fed into the heated reactor at 6.9 g/min. A second monomer feed (far tank) composed of 159.2 g of butyl acrylate, 12.9 g of ethylene glycol dimethacrylate (EGDMA), 120.1 g of butyl methacrylate, 5.0 g of methyl methacrylate, and 13.1 g of acrylic acid was fed into the near tank at 3.45 g/min. The feeds of the near tank into the reactor and far tank into the near tank were started simultaneously. After the monomer feed was completed, the contents of the reactor were held at 85° C. for 75 minutes. Ten minutes into the hold, 3.33 g of 25% ammonium hydroxide was added to the reactor (10% neutralization). After the hold, an additional 21.7 g of ammonium hydroxide was added to the reactor, and the reactor cooled to room temperature. Solids: 44%.

Example 16

Preparation of an Emulsion Polymer

This example provides an emulsion polymer ("EP-11") made from polymer particles polymerized in the presence of a support polymer having an acid number of 140. The support polymer content of the emulsion polymer is 15.8 wt. %, based on the dry weight of the emulsion polymer. No surfactant was used in the production of the emulsion polymer.

To a 2-liter resin kettle equipped with a stirrer, nitrogen purge and condenser were charged 757.45 g of water. The temperature was brought up to 85° C. then 1.65 g of ammonium persulfate dissolved in 33.0 g of water was added to the reactor. A monomer feed composed of 33.3 g of butyl acrylate, 20.8 g of styrene, 27.4 g of methyl methacrylate, 7.0 g of isooctyl mercapto propionate, and 24.5 g of methacrylic acid was fed into the reactor at 4.1 g/min. After the monomer feed, 3.3 g of ammonium persulfate dissolved in 157.6 g of water was fed into the reactor over ten minutes. After the second charge of ammonium persulfate was in the reactor, a monomer feed (near tank) initially composed of 258.0 g of butyl acrylate, 12.0 g of ethylene glycol dimethacrylate, 1.0 g of acrylic acid, and 30.1 g of methyl methacrylate was fed into the heated reactor at 6.7 g/min. A second monomer feed (far tank) composed of 75.3 g of butyl acrylate, 12.6 g of ethylene glycol dimethacrylate (EGDMA), 140.80 g of butyl methacrylate, 65.74 g of methyl methacrylate, and 6.7 g of acrylic acid was fed into the near tank at 3.35 g/min. The feeds of the near tank into the reactor and far tank into the near tank were started simultaneously. After the monomer feed was completed, the contents of the reactor were held at 85° C. for 75 minutes. Ten minutes into the hold, 2.67 g of 25% ammonium hydroxide was added to the reactor (10% neutralization). After the hold, an additional 17.3 g of ammonium hydroxide was added to the reactor, and the reactor cooled to room temperature. To the reactor was then charged with stirring 1.83 g of a 30% ammonium tartrate solution and 96.6 g of BACOTE 20. The content of the reactor were filtered through a 100-mesh screen prior to storage. Solids: 43%.

Examples 17

Evaluation of Examples 15 and 16

From the emulsions of EP-10 and EP-11 (Examples 15 and 16), inks were prepared by blending the emulsion polymer with the pigment concentrate from Example 11, BACOTE 20 and ammonium Tartrate (30%). The specific formulations and some selected properties for each of the resulting inks are given in Table 13. Table 14 presents viscosity data for EP-10 and EP-11 measured at different times. Neither emulsion underwent gellation during the course of this experiment.

TABLE 13

|  | INK | | | |
| --- | --- | --- | --- | --- |
|  | I-23 | I-24 | I-25 | I-26 |
| 1. EP-10 (g) | 100.0 |  | 100.0 |  |
| EP-11 (g) |  | 100.0 |  | 100.0 |
| BACOTE 20 (g) | 12.61 | 11.20 | 18.92 | 16.8 |
| Amm. Tartrate (30%) (g) | 0.25 | 0.22 | 0.25 | 0.25 |
| Total | 112.86 | 111.42 | 119.17 | 117.05 |
| INK FORMULATION (wt. %) |  |  |  |  |
| PC | 30.0 | 30.0 | 30.0 | 30.0 |
| EP-10 + EP-11 + BACOTE + Amm. Tartrate | 60.0 | 60.0 | 60.0 | 60.0 |
| Total | 90.0 | 90.0 | 90.0 | 90.0 |
| PROPERTIES (INITIAL) | RT | RT | RT | RT |
| Drying Condition | B | B | B | B |
| Dry Adhesion | 5 | 5 | 5 | 5 |
| Wet Adhesion | 5 | 5 | 5 | 5 |
| Wet Rub | 5 | 5 | 5 | 5 |
| Wet SATRA | 80/0 | 70/0 | 200/60 | 200/40 |
| Wet Crinkle | 4/3.5 | 3.5/3 | 5/4.5 | 4 |
| PROPERTIES (STORED 5 DAYS AT __ ° C.) | RT    40° C. | RT    40° C. | RT | RT |
| Drying Condition[2] | $B^1$    $B^1$ | $B^1$    $B^1$ | — | — |
| Dry Adhesion | 5    5 | 5    5 | — | — |
| Wet Adhesion | 5    5 | 5    5 | — | — |
| Wet Rub | 5    5 | 5    5 | — | — |
| Wet SATRA | 200/40    30/0 | 200/50    40/0 | — | — |
| Wet Crinkle | 4.5    2.5 | 4    2.5 | — | — |
| PROPERTIES (STORED 7 DAYS AT __ ° C.) | RT    40° C. | RT    40° C. | RT | RT |

TABLE 13-continued

| | | | | | | |
|---|---|---|---|---|---|---|
| Drying Condition | B | B | B | B | B | B |
| Dry Adhesion | 5 | 5 | 5 | 5 | 5 | 5 |
| Wet Adhesion | 5 | 5/4.5 | 5 | 5 | 5 | 5 |
| Wet Rub | 5 | 5 | 5 | 5 | 5 | 5 |
| Wet SATRA | 60/0 | 15/0 | 200/50 | 5/0 | 200/90 | 200/95 |
| Wet Crinkle | 3.5 | 1.5 | 3/2.5 | 1.5 | 5/4.5 | 5/4.5 |
| PROPERTIES | | | | | | |
| (STORED 21 DAYS AT __ ° C.) | RT | 40° C. | RT | 40° C. | | |
| Drying Condition | B | B | B | B | B | B |
| Dry Adhesion | 5 | 5 | 5 | 5 | 5 | 5 |
| Wet Adhesion | 5 | 4.5 | 5 | 5 | 5 | 5 |
| Wet Rub | 5 | 5 | 5 | 5 | 5 | 5 |
| Wet SATRA | 35/0 | 5/0 | 60/0 | 5/0 | 200/95 | 200/95 |
| Wet Crinkle | 3.5 | 2.5 | 3.5 | 1.5 | 4.5 | 5/4.5 |

[2]Drying conditions were 1 min at 60° C. followed by 24 h at RT (room temperature). water soak time was 1 hr.

TABLE 14

Viscosity Data for Examples 15 and 16

| | Storage Temperature | Viscosity Initial (mPas) | Viscosity after 1 day (mPas) | Viscosity after 5 days (mPas) | Viscosity after 7 day (mPas) |
|---|---|---|---|---|---|
| EP-10 | RT | 60 | 40 | 40 | 40 |
| | 40° C. | — | 40 | 60 | 60 |
| Ink from EP-10 | RT | 140 | 60 | 60 | 50 |
| | 40° C. | — | 60 | 140 | 260 |
| EP-11 | RT | 100 | 120 | 120 | 120 |
| | 40° C. | — | 140 | 160 | 180 |
| Ink from EP-11 | RT | 160 | 100 | 80 | 70 |
| | 40° C. | — | 80 | 400 | 480 |

It should be understood that the invention is not confined to the particular formulations illustrated and defined, but embraces all such modified forms thereof as come within the scope of the following claims.

What is claimed is:

1. A composition comprising:
   a continuous phase comprising water and a carboxylic acid-functional support polymer;
   a multivalent metal crosslinker selected from the group consisting of Zr, Ti, Hf, Cr, Zn, and Al ions or a combination thereof;
   a stabilizing agent; and
   a dispersed phase comprising crosslinked, dispersed polymer particles;
   wherein:
   the composition is an emulsion composition;
   the emulsion composition does not gel after storage for 8 days at 40° C.;
   the polymer particles comprise polymers polymerized from self-crosslinkable monomers and crosslinked via a crosslinking agent;
   the emulsion composition is suitable for use as a printing ink; and
   the emulsion composition provides a printability of less than or equal to 100 prints;
   wherein:
   the printability is the number of prints required to regain at least 95% print image quality after a print-stop of at least five minutes on a Moser-type gravure printing press running at 20 m per min in a climate controlled room maintained at 50% relative humidity and 22° C., the Moser-type gravure printing press comprising:
   a gravure cylinder with 120 lines per cm;
   an impression roll having a hardness of 75°, a shore printing pressure of 1 bar and a measured contact area of 9 mm; and
   an in-line Corona treatment of 500 W; and
   each print is a printed image that is repeated from the same portion of the gravure cylinder.

2. The composition of claim 1 wherein the carboxylic acid-functional support polymer has an oxygen content of at least about 10 wt. %.

3. The composition of claim 1 wherein the carboxylic acid-functional support polymer has a glass transition temperature of less than about 150° C.

4. The composition of claim 1 wherein the carboxylic acid-functional support polymer has an acid number of at least about 120 mg KOH/g polymer.

5. The composition of claim 1 wherein the carboxylic acid-functional support polymer has an oxygen content of about 10 to 30 wt % and an acid number of about 120 to 250 mg KOH/g polymer.

6. The composition of claim 1 wherein the carboxylic acid-functional support polymer is an alkali soluble resin.

7. The composition of claim 1 wherein the carboxylic acid-functional support polymer comprises polymerized monomers selected from one or more of acrylic acid, methacrylic acid, itaconic acid, maleic acid, fumaric acid, crotonic acid, acrylic anhydride, methacrylic anhydride, itaconic anhydride, maleic anhydride, fumaric anhydride, crotonic anhydride, styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, vinyl esters, and vinyl chloride.

8. The composition of claim 1 wherein the carboxylic acid-functional support polymer has a number average molecular weight of about 1500 to 8000 g/mole.

9. The composition of claim 1 wherein the self-crosslinkable monomers comprise diacetone acrylamide monomers and the crosslinking agent comprises a dihydrazide, a diamine, and a polyamine.

10. The composition of claim 1 wherein the self-crosslinkable monomers comprise acetoacetoxy functionalities and the crosslinking agent comprises a polyamine.

11. The composition of claim 10 wherein the self-crosslinkable monomers comprise acetoacetoxyethyl methacrylate, acetoacetoxy ethyl acrylate, or a combination thereof.

12. The composition of claim 1 wherein the polymer particles are polymerized from crosslinking monomers.

13. The composition of claim 12 wherein the crosslinking monomers comprise ethylene glycol diacrylate, ethylene glycol dimethacrylate, diethylene glycol dimethacrylate, diethylene glycol diacrylate, trimethylol propane triacrylate, trimethylol propane trimethacrylate, hexanediol diacrylate or combinations thereof.

14. The composition of claim 1 wherein the self-crosslinkable monomers account for at least about 0.5 wt % of the polymer particles.

15. The composition of claim 12 wherein the crosslinking monomers account for at least about 0.5 wt % of the polymer particles.

16. The composition of claim 1 wherein the polymer particles further comprise polymers that are polymerized from monomers selected from the group consisting of ethyl methacrylate, methyl methacrylate, butyl acrylate, butyl methacrylate, 2-ethylhexyl acrylate, ethyl acrylate, vinyl acetate, methyl acrylate, 2-hydroxyethyl methacrylate, 2-hydroxyethyl acrylate, glycidyl acrylate, glycidyl methacrylate and mixtures thereof.

17. The composition of claim 16 wherein the polymer particles are further polymerized from monomers comprising carboxylic acid functionalities and further wherein the polymer particles are crosslinked with the carboxylic acid-functional support polymer.

18. The composition of claim 1 wherein the carboxylic acid-functional support polymer accounts for at least about 15 wt % of the total weight of the carboxylic acid-functional support polymer and the polymer particles.

19. The composition of claim 1 wherein the carboxylic acid-functional support polymer has a glass transition temperature of about 5 to 150° C. and the polymer particles have a glass transition temperature of no more than about 20° C.

20. The composition of claim 1 wherein the polymer particles have a glass transition temperature of at least about −30° C. and the carboxylic acid-functional support polymer accounts for at least about 45 wt % of the total weight of the carboxylic acid-functional support polymer and the polymer particles.

21. The composition of claim 1 wherein the polymer particles have a glass transition temperature of at least about −10° C. and the carboxylic acid-functional support polymer accounts for at least about 30 wt % of the total weight of the carboxylic acid-functional support polymer and the polymer particles.

22. The composition of claim 1 wherein the polymer particles have a glass transition temperature of at least about 10° C. and the carboxylic acid-functional support polymer accounts for at least about 20 wt % of the total weight of the carboxylic acid-functional support polymer and the polymer particles.

23. The composition of claim 1 wherein the stabilizing agent is selected from the group consisting of tartaric acid, gluconic acid, mucic acid, saccharic acid, oxalic acid, glycolic acid, lactic acid, malic acid, citric acid, mandelic acid, malonic acid, maleic acid, and succinic acid.

24. The composition of claim 1 wherein the multivalent metal crosslinker is a salt or complex of ammonia, acetate, propionate, sulfate, carbonate, nitrate, phosphate, tartrate, acetylacetonate, or a combination thereof.

25. The composition of claim 1 wherein the amount of multivalent metal crosslinker in the composition is about 2 to 15 wt %.

26. The composition of claim 1 wherein the polymer particles further comprise a polymerized reactive surfactant.

27. The composition of claim 26 wherein the reactive surfactant accounts for about 1 to 8 wt % based on the total weight of the reactive surfactant plus the polymer particles.

28. The composition of claim 26 wherein the reactive surfactant comprises a polyoxyethylene alkylphenyl ether, a polyoxyethylene alkylphenyl ether ammonium sulfate or a mixture thereof.

29. An ink comprising the composition of claim 1, a pigment and water.

30. A method for making a stable emulsion composition comprising:
(a) polymerizing monomers in an aqueous emulsion polymerization in the presence of a carboxylic acid-functional support polymer to provide an emulsion, the emulsion comprising a continuous phase comprising water and the carboxylic acid-functional support polymer;
(b) mixing a multivalent metal crosslinker and a stabilizing agent into the emulsion to provide a stable emulsion composition; wherein the emulsion composition does not gel after storage for 8 days at 40° C.; and wherein the emulsion further comprises a dispersed phase comprising crosslinked, dispersed polymer particles the polymer particles are polymerized from self-crosslinkable monomers and crosslinked via a crosslinking agent;
wherein the emulsion composition is suitable for use in a printing ink;
the multivalent metal crosslinker is selected from the group consisting of Zr, Ti, Hf, Cr, Zn, and Al ions or a combination thereof; and
the stable emulsion composition provides a printability of less than or equal to 100 prints;
wherein:
the printability is the number of prints required to regain at least 95% print image quality after a print-stop of at least five minutes on a Moser-type gravure printing press running at 20 m per min in a climate controlled room maintained at 50% relative humidity and 22° C., the Moser-type gravure printing press comprising:
a gravure cylinder with 120 lines per cm;
an impression roll having a hardness of 75°, a shore printing pressure of 1 bar and a measured contact area of 9 mm; and
an in-line Corona treatment of 500 W; and each print is a printed image that is repeated from the same portion of the gravure cylinder.

31. The method of claim 30 wherein the emulsion polymerization is a continuous polymerization.

32. The method of claim 30 wherein the emulsion polymerization is a multi-stage polymerization or a power feed polymerization.

33. The method of claim 32 wherein the emulsion polymerization is a two-stage polymerization and further wherein the average glass transition temperature of the first stage monomers is lower than the average glass transition temperature of the second stage monomers.

34. The method of claim 32 wherein the emulsion polymerization is a power feed polymerization and further wherein the outer surfaces of the polymer particles is polymerized from higher $T_g$ monomers than the interiors of the polymer particles.

35. The method of claim 30 wherein the carboxylic acid-functional support polymer forms a shell on the polymer polymers to provide core-shell polymers.

36. The method of claim 30 wherein the carboxylic acid-functional support polymer has an oxygen content of at least about 10 wt %.

37. The method of claim 30 wherein the carboxylic acid-functional support polymer has an acid number of at least about 120 mg KOH/g polymer.

* * * * *